PULSE DELAY AND REFORM CIRCUIT WITH SHORT PULSE REJECTION

Filed Nov. 1, 1962

INVENTOR.
SAMUEL A. WELK
BY C. A. Gulbrandsen
ATTY 3,210,614
PULSE DELAY AND REFORM CIRCUIT WITH SHORT PULSE REJECTION Samuel A. Welk, Belmont, Calif., assignor, by mesne assignments, to Automatic Electric Laboratories, Inc., Northlake, Ill., a corporation of Delaware Filed Nov. 1, 1962, Ser. No. 234,731
12 Claims. (Cl. 317—148)

The invention relates to arrangements for effecting slow action of an electromagnetic device and more particularly to arrangements for delaying and reforming pulses.

Arrangements for reforming or repeating pulses have been used to great advantage in the field of communications, for example, relay type repeating arrangements and various E & M signalling systems. However, some types of pulse repeating schemes will respond to transient voltages which may be introduced into the transmission path. Minimization of such responses is highly desirable for the prevention of false signalling. J. T. Salihi, in his copending application, Serial No. 814,526, filed May 20, 1959, and assigned to the same assignee as the present invention, discloses a frequency selective detector for use in an in-band signalling system, wherein two transistor switches control the saturation state of a saturable reactor, which in turn effects a time delay in the operation of a bistable multivibrator. This arrangement, however, employs many components in its construction.

It is an object of the invention to provide a novel and improved pulse delay and reforming arrangement.

Another object of the invention is to provide an economical pulse delay and reforming arrangement requiring only a few components for its construction.

Still another object of the invention is to provide a pulse delay and reforming arrangement that is selective to reject pulses having a width that is less than the specified delay time.

A still further object of the invention is to provide a pulse delay and reforming arrangement that is selective to reject pulses of less than a specified magnitude.

According to the invention, a saturable reactor having a core which possesses a rectangular hysteresis characteristic is employed to provide slow-to-operate and slow-to-release characteristics for an electromagnetic device, which may advantageously be a reed relay and may also advantageously be a polarized reed relay of the type having mercury-wetted contacts. It may be well to point out that there is no low reluctance path in encapsulated reed relays and that conventional means, such as slugs, are not practical for effecting slow action of such relays. It is therefore another object of the invention to provide a novel arrangement for effecting slow action of an electromagnetic device.

Other objects and features of the invention will become apparent from the following description and the accompanying drawings.

Briefly, in the embodiment disclosed herein, a direct current pulse having an amplitude that is over a certain value and a pulse width that is greater than a specified value will be reformed or repeated at the output of the arrangement. The just-mentioned values will be explained below.

Figure 1:
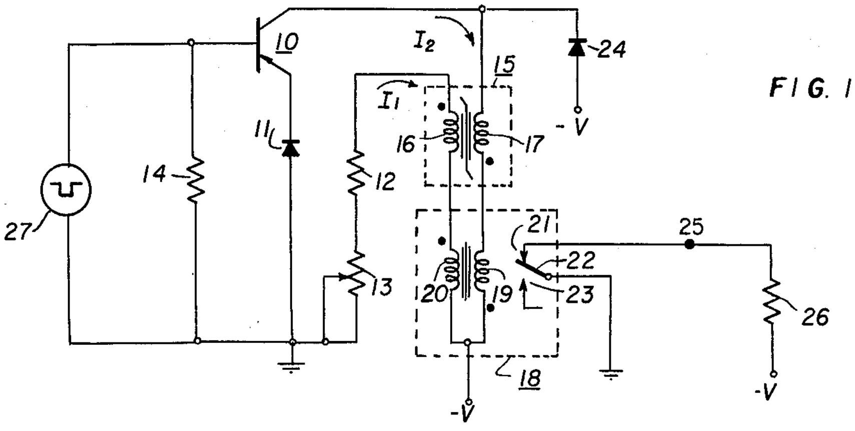
FIG. 1 is a circuit diagram of an embodiment of the invention.

Referring to FIG. 1, a saturable reactor 15 having a core of a material possessing a rectangular hysteresis characteristic and also having two windings 16 and 17 is employed to provide slow action for a reed relay 18 having two windings 19 and 20. Variable resistance 13, resistance 12 and the aforementioned windings 16 and 20, along with the direct current supply (—V), form a direct current path for current $I_1$. Another direct current path for current $I_2$, including the direct current source (—V), exist by way of transistor 10 and the aforementioned windings 17 and 19. Other components and their functions will be explained along with the operation of the arrangement. The input and output pulses of FIGS. 2A, 2B, 2C and 2D will also be explained in the following detailed description.

Figures 2A, 2B, 2C, 2D:
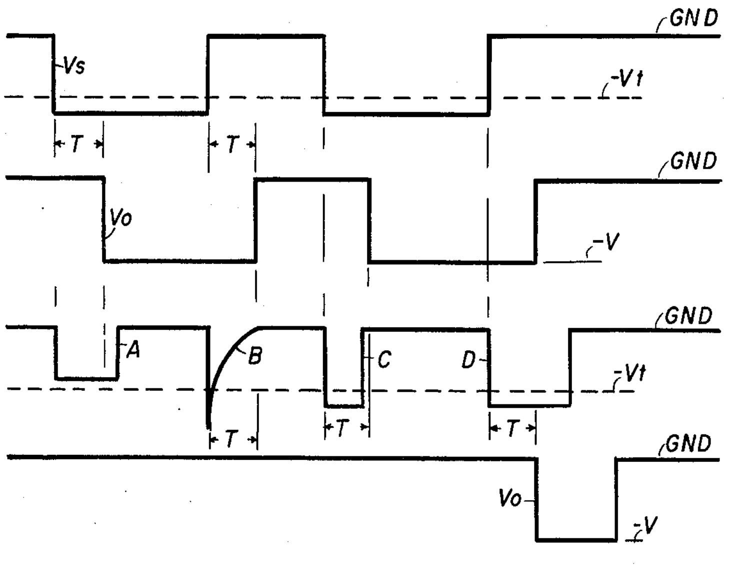
FIGS. 2A, 2B, 2C and 2D are diagrams of the pulses at the input and output of the embodiment shown in FIG. 1.

Referring now to FIGS. 1, 2A and 2B, assume that there is as yet no input to the base of transistor 10 from the pulse generator 27. Transistor 10 is biased at this time so as to be non-conducting; ground potential is connected to the base and emitter by way of resistance 14 and diode 11, respectively. A direct current path for $I_1$ exists, as previously described by way of resistances 13 and 12 and windings 16 and 20; the core of the reactor 15 thereby being in a state of saturation, say negative saturation. Winding 20 is energized by current $I_1$ and armature element 22 is in a position making contact with element 21. The degree of magnetic intensity and position of saturation, according to the B–H curve of the particular material of the core, may be controlled by varying resistance 13.

Assume now that the pulse generator 27 provides a pulse of a large enough value (e.g. more negative than $-V_t$) to cause transistor 10 to conduct. There is now a current path for current $I_2$ by way of the emitter and collector of the transistor, winding 17 of the reactor and winding 19 of the relay, which causes a large portion of the supply voltage (—V) to be applied across the winding 17 causing the core to first de-saturate from the assumed negative state and then after a time delay (T in FIGS. 2A–2D) to saturate in the opposite direction. The components are chosen so that current $I_2$ will cause substantially twice the magnetic field as that caused by current $I_1$. During the time delay T the reactor offers a high impedance to direct current. However, in a saturation state the impedance offered to direct current is much lower. At the completion of the reversal of saturation, current $I_2$ will energize winding 19, which will overcome the effect that the energized winding 20 has on armature element 22, and cause the armature element 22 to transfer from contact 21 close on contact 23 placing connection 25 at potential (—V).

At the completion or trailing edge of the pulse, transistor 10 is disabled and opens the path for current $I_2$. The magnetic energy in the windings 17 and 19 is then dissipated by a current, derived from the flux reversal, flowing through the shunt diode 24. Current $I_1$ again gains control and places the reactor back in negative saturation. The time delay T is also present during this reversal of saturation, that is during the time that the magnetic energy in windings 19 and 17 is being dissipated and current $I_1$ finally gains control. Winding 20 of relay 18 is still energized and winding 19 is now de-energized and the armature element breaks contact with element 23 and again makes contact with element 21.

FIG. 2A shows similar recurring pulses, for example, resulting from dial pulses. The reference potential ($-V_t$) is the value of input potential that is needed to overcome the base-emitted junction of transistor 10 and the series diode 11. This potential may be changed, for example, by using different diodes or more than one diode in series. The output pulses $V_0$ shown in FIG. 2B are of the value (—V) corresponding to the potential that is connected to the relay element 21 by way of connection 25 and resistance 26. Resistance 26 may be the resistance of a relay winding. The reference level of the pulses is shown to be ground potential for illustration with the particular embodiment shown in FIG. 1; however, other potentials may advantageously be used according to the particular application. It is shown that the output pulses $V_0$ in FIG. 2B are delayed a time T with respect to the input pulses $V_s$. The delay time T is the time required for the reactor core to reverse states of saturation and allowing either relay winding 19 or 20 to be in controlling state of energization of relay 18. In a particular arrangement, a saturable reactor was employed to provide a 25 millisecond delay, which is shorter than the shortest dial pulse normally encountered (about 30 milliseconds) and long enough to considerably minimize the response to noise.

Referring now to FIGS. 2C and 2D and keeping in mind the required conduction level $(-V_t)$ and the time delay T, several input pulses A, B, C, and D are shown along with the respective resulting outputs. Pulse A, being less than $(-V_t)$, and unable to enable transistor 10 is not reformed at the output connection 25. Pulse B, transient in nature, and pulse C are greater than the value $(-V_t)$. However, neither of these pulses appear at the output. While each may be of a value that is great enough to enable transistor 10, each has disappeared before the time delay T, that is the reactor 15 has not completed a reversal of saturation and is acting as a large impedance to direct current. Therefore, current $I_2$ cannot energize winding 19 and cause the armature element 22 to transfer from element 21 to element 23. The pulse D, similar to the recurring pulses of FIG. 2A, will be reformed on connection 25.

Referring again to FIG. 1 and FIG. 2A, the resistance 13 may be varied to control the amount of magnetic bias of the reactor 15 and the relay 18 by the respective windings 16 and 20 and thereby control the width of the output pulse. In this way, the output pulse width can be varied to equal the input pulse width. An analogy to this is the changing of the amount of spring force that is used to restore the armature of electromechanical relays.

While the invention has been shown particularly employing a PNP transistor, an NPN transistor may also be used by making the proper polarity changes. Also, the potential $(-V)$ connected to resistance 26 is shown in this particular embodiment to be the same as the potential connected to the relay windings 19 and 20. In certain applications it may be advantageous to employ different potentials at these two points.

While the invention has been shown in a preferred embodiment, changes and modifications may be made by one skilled in the art without departing from the spirit and scope of the invention and should be included in the appended claims.

What is claimed is:

1. An arrangement for effecting slow action of an electromagnetic device having a winding, said arrangement comprising: a saturable reactor having a winding; means for placing said reactor in a predetermined state of saturation; a direct current path including the winding of said device and the winding of said reactor in series; and switching means for controlling the flow of direct current traversing said path so as to cause a reversal of the state of saturation of said reactor.

2. An arrangement for effecting slow action of an electromagnetic device, as claimed in claim 1, wherein said electromagnetic device is a reed type relay.

3. An arrangement for effecting slow action of an electromagnetic device, as claimed in claim 1, wherein said saturable reactor has a core possessing a rectangular hysteresis characteristic.

4. An arrangement for effecting slow action of an electromagnetic device, as claimed in claim 1, wherein said reactor and said device each have a second winding, said second windings being connected in series forming a second direct current path.

5. An arrangement for effecting slow action of an electromagnetic device, as claimed in claim 4, wherein the direct current flowing in said first mentioned path causes substantially twice the magnetic field intensity as the direct current flowing in said second path.

6. An arrangement for effecting slow action of an electromagnetic device, as claimed in claim 1, wherein said switching means includes a transistor having a base, an emitter, and a collector, and diode means connected to said emitter to establish a conduction threshold value for said transistor, said transistor being biased so as to conduct a direct current through said path upon receipt of pulses at said base that are greater than said threshold value.

7. An arrangement for effecting slow action of an electromagnetic device, as claimed in claim 6, and further comprising means including other diode means connected in shunt relation to said two serially connected windings operable during the non-conducting state of said transistor to complete a shunt current path for dissipating the magnetic energy stored in said two windings.

8. An arrangement for delaying and reforming pulses comprising: a source of pulses; a saturable reactor having a winding; means for normally keeping said reactor in a predetermined state of saturation; a relay having a winding serially connected to said reactor winding and having an armature element and a contact element for reforming said pulses; a direct current path including said windings in series; and switching means operable responsive to said pulses for alternately closing and opening said direct current path for alternately reversing the state of saturation of said reactor.

9. An arrangement for delaying and reforming pulses, as claimed in claim 8, wherein said relay is a reed relay of the polar type.

10. An arrangement for delaying and reforming pulses, as claimed in claim 8, wherein said saturable reactor includes a core having a rectangular hysteresis characteristic.

11. An arrangement for delaying and reforming pulses, as claimed in claim 8, and further comprising diode means connected in shunt relation to said two windings so as to substantially short said windings for dissipating the magnetic energy in said windings during the time said direct current path is open.

12. An arrangement for delaying and reforming pulses, as claimed in claim 11, wherein said reactor and said relay each have a second winding, said second windings being connected in series relation to form a second current path and wherein said means for normally keeping said reactor in said predetermined state of saturation includes means for varying the amount of direct current traversing said second path, thus controlling the value of magnetic field intensity of said second relay winding.

References Cited by the Examiner

UNITED STATES PATENTS

| | | | |
|---|---|---|---|
| 1,940,335 | 12/33 | Suits | 317—148 X |
| 1,997,179 | 4/35 | Logan | 321—24 |
| 2,757,320 | 7/56 | Schuh | 317—148 X |
| 3,075,127 | 1/63 | Secunde et al. | 317—147 |

SAMUEL BERNSTEIN, *Primary Examiner.*